Jan. 31, 1956     D. R. JOYCE     2,732,729
THROTTLE CONTROLLER FOR AUTOMOTIVE VEHICLES
Filed Feb. 19, 1953
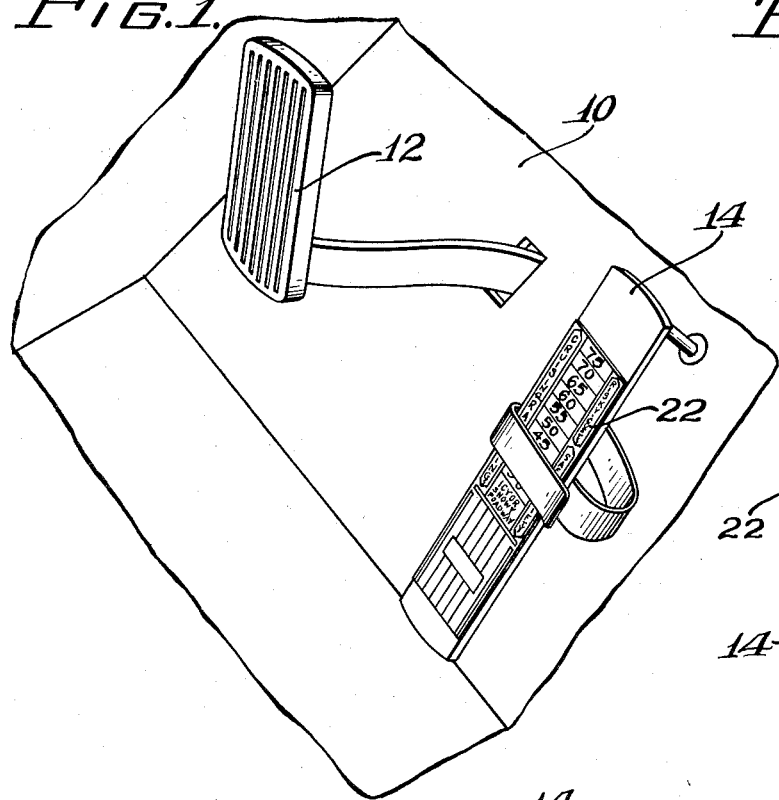
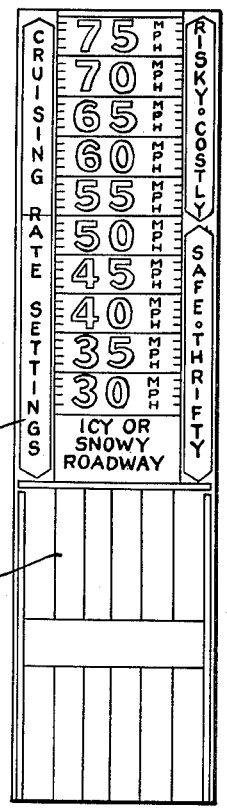
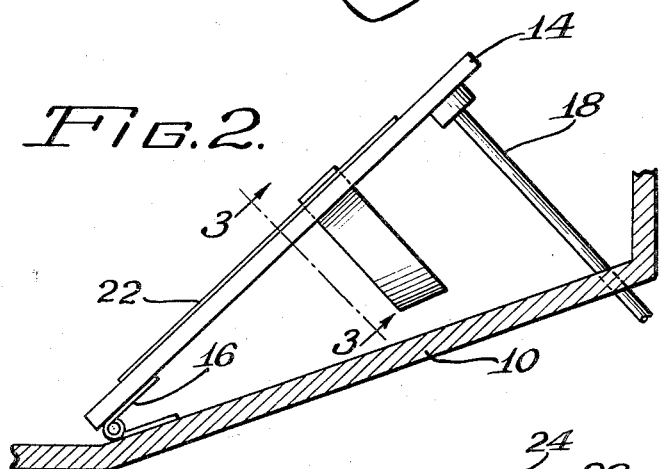
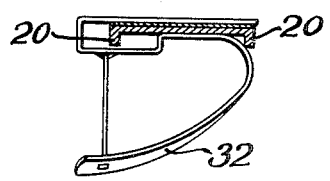
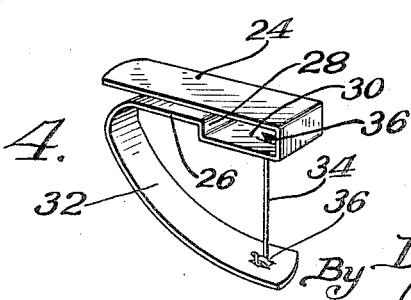
Inventor:
Don R. Joyce
By Warren I. Horton
Atty.

United States Patent Office 2,732,729
Patented Jan. 31, 1956

2,732,729

THROTTLE CONTROLLER FOR AUTOMOTIVE VEHICLES

Don R. Joyce, River Grove, Ill.

Application February 19, 1953, Serial No. 337,706

4 Claims. (Cl. 74—526)

My invention relates to a foot throttle controller for an automotive vehicle of the type illustrated and described in the patent issued on October 19, 1943, to Maurice F. Duffy, Patent No. 2,332,064 and my present invention is specifically for improvements upon the structure shown in that patent.

The object of my invention in general is to provide the throttle controlling pedal or accelerator of an automobile or other automotive vehicle with an attachment for automatically controlling or limiting the speed of a vehicle by means attached to the accelerator to automatically notify the driver when a predetermined speed of the vehicle has been reached, without, however, preventing the driver from increasing the speed of the vehicle beyond that point. With the use of my device, the driver will, however, be fully aware of the fact that he is driving the vehicle at a speed in excess of the presetting of my device.

The objects and desirability of a throttle controller of the type of my invention is thoroughly well described in the Duffy Patent No. 2,332,064 to which reference has been made and a review of the prior art as I understand it is also set forth in said Duffy Patent No. 2,332,064.

The foot throttle attachment of my invention may be briefly and generally described as a strip of spring metal, one end of which is bent into a generally U-shaped spring clip which may be slipped over the edge of a standard accelerator pedal provided in most automobiles to hold the attachment to and in a given position on the accelerator pedal and the other end of which is bent into an arcuate spring foot projecting downwardly from the spring clip into the space between the accelerator pedal and the floorboard. The spring clip of my structure differs from that specifically described in the Duffy patent in three important particulars. First, the underside of the generally U-shaped clip is bent at one side of the U to provide a portion of the clip with a wider space between the arms of the U adjacent its base than the space provided between the upper ends of the arms of the U. This particular formation is to accommodate the particular forms of accelerator pedals in use and also to provide a closer and tighter fit of the upper portion of the spring clip end of my device to the face of the accelerator pedal.

A second important difference between the structure of my invention and that described in the Duffy patent is that the spring foot end of my structure is generally arcuate from its connection with the U-shaped clip to the free end which is adapted to contact the floor board or carpet of the automobile. Generally speaking, the purpose of this foot is to provide a more resilient and more easily calibrated spring action to this portion of my device than is present in the comparable portion of the Duffy device.

The third important structural change in my device, as compared with that of the Duffy patent, is that the U clip end of my device and the free end engaging the floorboard or carpet are connected by means which retain the free spring end under a preloaded tension. Generally speaking, the purpose of this structure is to keep the device more accurately responsive to pedal pressure and to permit it to be more accurately calibrated in connection with another portion of my invention which I shall now describe generally.

I provide a calibration setting plate or strip to be mounted upon the accelerator pedal between the free end of the U section of my structure and the upper face of the accelerator pedal of the automotive vehicle. This plate or strip is calibrated to desired speeds which are plainly marked thereon and which will permit the driver of the automobile accurately to locate the spring clip section of my invention relative to the calibration chart after a very brief adjustment period.

Different makes of automobiles and, indeed, different automobiles of the same make and model are not uniform in the response of the speed of the automobile engine to the particular position of the foot throttle or accelerator pedal. Indeed, it is common that adjustments are provided in every car between the foot accelerator pedal and the throttle adjacent the engine so that the relation of the position of the accelerator pedal to the speed of the engine may be adjusted or altered.

The calibration chart of my invention is mounted upon the accelerator pedal by the driver after a short test in which the clip portion of my invention is also used so that the clip portion will be so positioned relative to the calibration chart and the chart relative to the accelerator pedal that a setting of a predetermined speed, say 30 M. P. H., may be located. The calibration chart of my invention is then mounted upon the accelerator pedal so as to correspond with the test setting. After the calibration chart has been so mounted, the spring clip portion of my controller is slipped over the accelerator pedal so that the pedal or the greater portion thereof will lie between the arms of the U. This element will then be slidably adjustable upon the accelerator pedal relative to different speeds and driving conditions marked upon the calibration chart.

It should be understood that the free spring end of my device is not in engagement with the floor board or the carpet of the automobile when the accelerator pedal is in its idling position. However, if the device is adjusted relative to the calibration chart and the accelerator pedal is, say 30 M. P. H. speed, the spring end of my device will engage the floor board or its carpet when the accelerator pedal has been depressed to a point at which the motor of the automotive vehicle will respond to drive the vehicle at that speed under normal road conditions. If the driver of the automotive vehicle then wishes to drive the car beyond that speed, he may do so by the application, however, of a considerably increased foot pressure to overcome the limiting effect of the spring end of my device and permit the pedal to be pushed beyond the 30 M. P. H. position, and, indeed, if he wishes all the way to a wide open throttle position. It is the force required to overcome the resistance of the spring foot in its original position which provides the driver with a differential limit or signal—a limit to which he can easily and certainly push and hold the accelerator pedal except when, as in emergencies, he may desire to push the pedal to a position beyond that indicated by the setting of his structure.

If the driver of a vehicle equipped with my invention desires to drive it say within the city only upon a particular trip and wishes, therefore, to limit his speed under normal conditions to say 30 M. P. H., he can by using the device of my invention very easily maintain a better average rate of speed since he may without even looking at his speedometer be aware of his speed within accurate limits simply by the pressure which he applies to the accelerator pedal. If this driving is to be say in the country or on a long trip on a super-highway, he may set the device of my invention at a considerably higher speed of say 60 M. P. H. and may accurately maintain that speed without careful attention to his speedometer reading and the result will be that his driving average per day will be more nearly that of a schedule which he may preset than it would be without the structure of my invention. He will also find that at the end of any driving period, he will be less tired when using the structure of my invention than he would be in driving his vehicle without it.

By maintaining a fairly constant speed rather than an irregular speed in spurts, an automobile is much more economical in consumption of fuel. I have found it to be startlingly proved that a substantial gas economy is effected over a period of time by use of a structure of my invention as compared with driving the same automobile without such an accessory.

The differences which I have provided in my structure as compared with the structure of the Duffy Patent No. 2,332,064 all contribute greatly to the ease of adjustment of the device to desired speed or road conditions and to the comfort of the driver as well as to more accurate adjustment of the device for a desired speed position.

It will be obvious from the drawings and description that my device may be easily and quickly mounted upon any standard accelerator pedal by any person and that no special mechanical skill and no tools are required for that purpose.

The simplicity of my structure and of its operation and method of use and objects, advantages and benefits other than those which I have mentioned will become apparent and will be more readily understood by reference to the accompanying drawing in which:

Fig. 1 is a perspective view of a conventional automobile floor board arrangement showing the calibration chart or gauge and the spring clip of my invention positioned on an accelerator pedal;

Fig. 2 is a perspective view from the side of a conventional accelerator pedal showing my invention mounted in position upon it and indicates the normal spacing between the free spring end of my structure and the floor board or carpet indicated in section;

Fig. 3 is a cross sectional view taken on the plane 3—3 as indicated in Fig. 2;

Fig. 4 is a perspective view of the spring clip attachment portion of my invention;

Fig. 5 is a top plan view of the calibration chart or gauge portion of my invention showing typical settings which may be marked thereon.

In making the spring clip portion of my device, I have found it quite satisfactory to bend a strap-shaped strip of spring metal generally into the form shown in Fig. 4 but with the foot end more nearly perpendicular in its dependence from the juncture with the inner arm of the U-portion, it being understood, of course, that the bending of the metal is accomplished before the convolutions are set in their final form by appropriate hardening and tempering.

I have found that I can make the structure of my invention of a more or less standard size and calibration of chart or gauge as I have found from experience that the variation between makes and models of automobiles, insofar as construction of the accelerator pedal, spacing of the pedal from the floor board and travel of the accelerator pedal for relative speeds are concerned, is very slight, such elements being very nearly the same on almost all standard makes of passenger cars and trucks.

Referring particularly to the drawings, I will describe my invention in detail:

In Fig. 1, I have shown the portion of an automobile floor board 10. Extending through the floor board 10 is a brake pedal 12 shown merely to indicate its position relative to the accelerator pedal 14. The accelerator pedal in normal use is hinged at one end to the floor board as indicated by the hinge means 16, in Fig. 2. At its upper end, the accelerator pedal is connected to a rod 18 which through intermediate means opens and closes the throttle as the accelerator pedal is depressed or raised. As shown in Fig. 3, the standard accelerator pedal is generally provided with stiffening flanges 20 at either side.

The calibrated chart 22 of my invention is mounted on the top face of the accelerator pedal in any appropriate manner and located at such a point thereon as may be determined by preliminary tests. While the calibration chart may be made of any suitable material, I have found it quite satisfactory to use a self-adhering gauge of fibre base in which portions which may generally be considered as safe and thrifty driving speeds may be indicated in green and risky or costly speeds may be indicated in red. I have found that the self-adhering gauge has a very satisfactory life and may quickly be replaced by new bright calibration charts if desired. The pedal attachment element of my invention is appropriately made of spring metal strap, the upper part of which is bent into a generally U-shaped spring clip represented by the clamping jaws 24 and 26. The jaw 24, being that intended to rest over the calibration chart 22, has a flat surface. The jaw 26 is bent toward the upper jaw and then continued parallel with the jaw 24 to provide a space 30 and an abutment 28 to accommodate flanges of various sizes comparable to the flanges 20 shown in Fig. 3. The lower or free end of the strap is bent in a bowed position as shown particularly in Fig. 3 and Fig. 4 and may be designated as the spring foot 32. The tension of the spring foot 32 is pre-loaded by bending it under tension toward the face 26 where it is secured from assuming its normal position by connection 34 which may suitably be of fine music wire. Means for anchoring both ends of the wire are indicated at 36.

It will be apparent from the drawing that the spacing between the accelerator pedal and the floor board increases between the hinged end and the throttle shaft end of the accelerator pedal, the spring clip of my invention being of uniform size. It will be clear that the spring foot end thereof will approach the automobile floor board as the clip is placed or slid downwardly toward the hinge of the accelerator pedal and that conversely the space between the spring foot of my structure and the floor board will increase as the clip is moved away from the hinged end of the accelerator pedal. It follows, of course, that the accelerator pedal will require further movement of the driver's foot to make contact between the spring foot and the floor board at high speeds than will be true at low speeds.

Having described my invention and its simplicity, economy of construction and the facility with which it may be installed and adjusted or re-adjusted to any conditions of use, I claim:

1. A throttle controller adapted to be attached to a flat throttle operating accelerator pedal pivoted at one end for adjustably opening said throttle, comprising a spring metal strip bent at one end into a U-shaped clip to engage tightly opposite faces of said pedal, the remainder of said strip being curved reversely against the force of said spring through about 180°, said curvature being maintained by a compressible link interconnecting said clip and the other end of said strip.

2. A throttle controller adapted to be attached to a flat throttle operating accelerator pedal pivoted at one end for adjustably opening said throttle, comprising a spring metal strip formed at one end into a clip to embrace tightly said pedal, the remainder of the strip being curved smoothly against the spring of the metal so that the other end of the strip is substantially parallel to the floor board of the automobile and meets the floor board at varying throttle openings as the controller is spaced varying distances from the pedal pivot, said curvature being maintained by a link strong only tensionally interconnecting said clip and said floor board engaging end.

3. A throttle controller adapted to be secured to a flat throttle operating accelerator pedal pivoted at one end, to notify the driver of an automotive vehicle when a pre-selected speed has been attained comprising a clip adapted to engage said pedal tightly at various distances from said pedal pivot, said clip including a flat plate extending transversely across the visible upper side of said pedal, means adapted to meet the floor board of said automobile at said pre-selected degree of throttle opening and to give under further pressure on said throttle and a chart adapted to be secured to the upper visible face of said pedal having a longitudinal scale of miles per hour increasing with remoteness from said pedal pivot and correlated with the differing angular movements of said pedal to bring said means to meet said floor board at different positions of said controller on said pedal, said flat plate overlying said chart to indicate the approximate vehicle speed at any point of placement of said clip.

4. A throttle controller adapted to be attached to a flat throttle operating accelerator pedal pivoted at one end for adjustably opening said throttle, comprising a spring metal strip formed at one end into a clip to embrace tightly said pedal, said clip including a flat plate extending transversely across the visible upper side of said pedal, the remainder of said strip being curved smoothly against the spring of the metal so that the other end of the strip is substantially parallel to the floor board of the automobile and meets the floor board at varying throttle openings as the controller is spaced varying distances from the pedal pivot, said curvature being maintained by a compressible link interconnecting said clip and the other end of said strip, and a chart adapted to be secured to the upper visible face of said pedal having calibrations in terms of miles per hour thereon, said flat plate overlying said chart to indicate the approximate vehicle speed at any point of placement of said clip.

References Cited in the file of this patent

UNITED STATES PATENTS

| | | |
|---|---|---|
| 1,196,976 | Pembroke | Sept. 5, 1916 |
| 1,646,937 | Spiro | Oct. 25, 1927 |
| 2,332,064 | Duffy | Oct. 19, 1943 |